United States Patent [19]
Gergen et al.

[11] Patent Number: 5,363,322
[45] Date of Patent: Nov. 8, 1994

[54] DATA PROCESSOR WITH AN INTEGER MULTIPLICATION FUNCTION ON A FRACTIONAL MULTIPLIER

[75] Inventors: Joseph P. Gergen; Peter A. Percosan, both of Austin, Tex.

[73] Assignee: Motorola, Inc., Schaumburg, Ill.

[21] Appl. No.: 679,470

[22] Filed: Apr. 2, 1991

[51] Int. Cl.[5] .......................... G06F 7/52; G06F 15/38
[52] U.S. Cl. .................................. 364/754; 364/750.5; 364/736
[58] Field of Search .................... 364/736, 754, 750.5, 364/751, 748

[56] References Cited

U.S. PATENT DOCUMENTS

| | | | |
|---|---|---|---|
| 4,594,678 | 6/1986 | Uhlenhoff | 364/736 |
| 4,597,053 | 6/1986 | Chamberlin | 364/750.5 |
| 4,841,467 | 6/1989 | Ho et al. | 364/748 |
| 4,876,660 | 10/1989 | Owen et al. | 364/750.5 |
| 4,958,312 | 9/1990 | Ang et al. | 364/754 |

OTHER PUBLICATIONS

Motorola DSP56116 Digital Signal Processor User's Manual, Oct. 1990. Page Numbers 3-6-3-9, A-9-8-A-101, A-120,121, A-158, 159.
Proceedings ICASSP 90, 1990 International Conference On Acoustics, Speech, and Signal Processing, Apr. 3-6, 1990, IEEE Signal Processing Society.
Nov. 5, 1990 Press Release Statements from Motorola, Inc., Spectrum Signal Processing, Inc., Ariel Corporation, and Mentor Graphics.

*Primary Examiner*—Roy N. Envall, Jr.
*Assistant Examiner*—Chuong D. Ngo
*Attorney, Agent, or Firm*—Elizabeth A. Apperley

[57] ABSTRACT

A data processing system (10) which primarily supports fractional multiplication operations has a multiplication logic circuit (20) for executing integer multiplication functions efficiently. During an integer multiplication function, two multiplicands are multiplied together as if the multiplication function was fractional. A predetermined accumulation input is stored and shifted to the right by a Right Shift Logic circuit (32) before being added to a product of the two multiplicands. An accumulated product of the multiplication function is formed by an adder (36) and shifted to the left by a Left Shift Logic circuit (38) until the accumulated product is in integer form. Implementing an integer multiplication operation with a fractional multiplier in the data processing system requires a single software instruction.

19 Claims, 2 Drawing Sheets

DATA PROCESSOR WITH AN INTEGER MULTIPLICATION FUNCTION ON A FRACTIONAL MULTIPLIER

CROSS REFERENCE TO RELATED APPLICATION

Related subject matter may be found in a commonly assigned copending U.S. patent application Ser. No. 07/679,459 now abandoned entitled, "A Data Processor With An Extended Precision Multiplication Function," by J. Gergen and filed of even date herewith.

FIELD OF THE INVENTION

This invention relates generally to data processors, and more particularly, to an integer multiplication function in a data processor which uses a fractional multiplier.

BACKGROUND OF THE INVENTION

A software instruction which implements a multiplication function in a data processing system augments both the versatility of the system and the applications in which the system may be used. Typical multiplication functions include both a simple multiply function which multiplies two multiplicands together to form a product and a multiply/accumulate function which executes a multiply function and adds the resulting product to the contents of a predetermined register. In both cases, the multiplication functions are generally implemented in a single software instruction. For example, the multiply function may be executed with an instruction labelled "MPY" and the multiply/accumulate function may be implemented by an instruction labelled "MAC."

Multiplication functions associated with software instructions such as MPY and MAC are generally implemented using one of two primary techniques. Typically, the data processing system is designated as providing either a fractional or an integer multiplication operation. As the name implies, the fractional multiplication operation usually involves multiplicands which are fractions. In a data processing system which implements the fractional multiplication operation, the product of the multiplication operation is stored to the right of a decimal point which is always located in a fixed position. The integer multiplication operation involves multiplicands which are integers. In the integer multiplication operation, the multiplicands are integer values which are stored in a plurality of bit positions to the left of the fixed decimal point. The product formed by an integer multiplication operation typically requires more bit positions to the left of the decimal point.

Typically, the application of the data processing system determines whether an architectural design of the system will implement either the fractional or the integer multiplication functions. For example, the fractional multiplication function is generally implemented on data processing systems which provide digital signal processing capabilities. Assume that a user of a data processing system which implemented an architecture which supports only the fractional multiplication function needs the result of an integer multiplication function. To obtain the result of the integer multiplication function, the user must typically write a software program using a fractional multiplication instruction and subsequently manipulate the fractional multiplication product to form the integer multiplication result.

The software program written by the user of the fractional data processing system results in increased instruction cycle time. However, the increased cycle time is often necessary if the response to the integer multiplication function must be provided. In many data processing system designs, both the time necessary to implement an instruction and the validity of the result of the instruction are of primary concern. However, in data processing system designs which implement fractional multiplication functions, the execution time of an instruction must be increased to provide a valid result in integer form.

SUMMARY OF THE INVENTION

The previously mentioned needs are fulfilled with the present invention. Accordingly, there is provided, in one form a data processor, and method of operation, with an integer multiplication function on a fractional multiplier comprising a program controller for receiving a plurality of data processing instructions and decoding each of the data processing instructions to provide control signals. A first storage means receives and stores first and second multiplicand operands which are in either fractional or integer form. A fractional fixed point multiplier/accumulator means is coupled to the first storage means for multiplying first and second multiplicand operands, said fractional fixed point multiplier/accumulator means providing an accumulated product operand of the first and second multiplicand operands. A second storage means receives and stores an accumulation value to be added to the product operand. A first shifting circuit is coupled to the second storage means for receiving the accumulation value and selectively fight shifting the accumulation value a first predetermined number of bit positions to the right in response to decoding an integer multiplication data processing instruction. An output of the multiplier/accumulator means provides an accumulated product. A second shifting circuit is coupled to the output of the multiplier/accumulation means for receiving the accumulated product and selectively left shifting the accumulated product a second predetermined number of bit positions to the left in response to the integer multiplication data processing instruction to provide an accumulated product in integer form.

These and other features, and advantages, will be more clearly understood from the following detailed description taken in conjunction with the accompanying drawings.

DETAILED DESCRIPTION OF A PREFERRED EMBODIMENT

Figure 1:
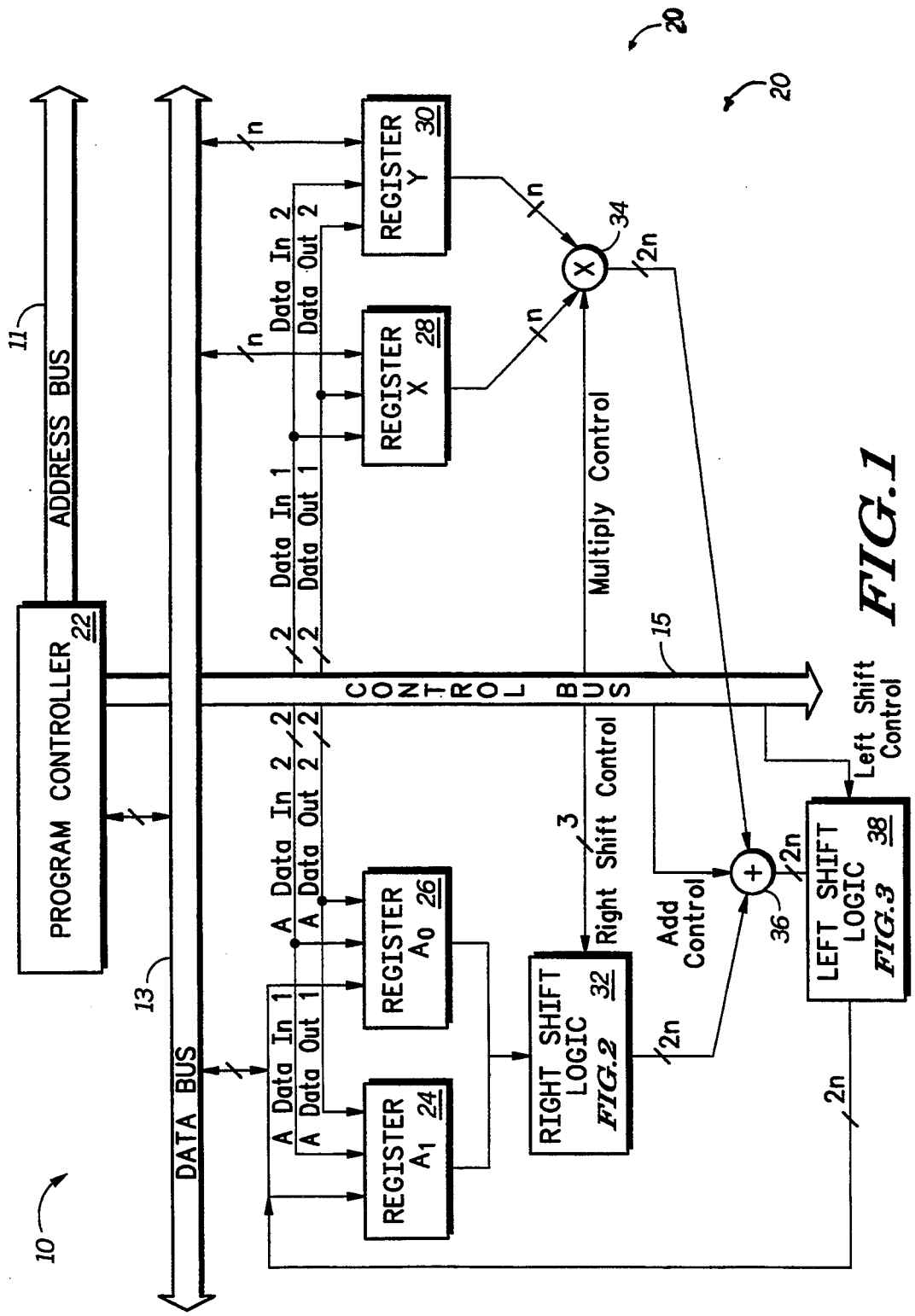
FIG. 1 illustrates in block diagram form a data processing system in accordance with the present invention with a multiplication logic circuit for implementing an integer multiplication function.

Multiplication functions with a fixed decimal point are generally implemented using one of two primary design architectures in a data processing system. Typically, the data processing system is designated as providing either a fractional or an integer multiplication operation. As the name implies, the fractional multiplication operation usually involves multiplicands which are fractions. In a data processing system which implements the fractional multiplication operation, the product of the multiplication operation is stored to the right of a decimal point which was always located in a fixed position. The integer multiplication operation involves multiplicands which are integers. In the integer multiplication operation, the multiplicands are integer values which are stored in a plurality of bit positions to the left of the fixed decimal point. The difference between fractional and integer multiplication operations is illustrated in the two tables illustrated below:

TABLE 1

| 0.    | 010...  | 0.25   |
|-------|---------|--------|
| × 0.  | 110     | 0.75   |
| 0.    | 00110...| 0.1875 |

TABLE 2

| 0011.   | 0 | 3  |
|---------|---|----|
| × 0101. | 0 | 5  |
| 01111.  | 0 | 15 |

Typically, the application of the data processing system determines whether the design architecture of the system will implement either fractional or integer multiplication functions. For example, the fractional multiplication function is generally implemented on data processing systems which provide digital signal processing capabilities. Additionally, the data processing system typically provides only software instructions implementing the fractional multiplication operation. If the user of the data processing system needed the result of an integer operation, a software program would be required to manipulate the product of the fractional multiplication operation into a product of the integer operation.

For example, assume that the user of a data processing system which implemented only fractional multiplication operations needed to calculate a position of a data entry in a two dimensional memory array. The position of the data entry is an integer value which is calculated using a following equation:

Position = $(i \times n) + j$

In the equation shown above, "i" equals the row of the data entry, "n" equals the number of columns in the memory array, and "j" equals the column of the data entry. To provide the result of the equation in the fractional data processing system, the following software program must be implemented:

| 1 | mpy  | X,Y,A |
| 2 | asr  | A     |
| 3 | move | A0,A1 |
| 4 | add  | B,A   |

In the program listed above, assume that a register X contains the value of "i", a register Y contains the value of "n", a register B contains the value of "j", and a register A stores intermediate results of the software program. In a data processing system which primarily supports fractional multiplication operations, a predetermined register is often accessed by more of the software instructions of the data processing system than another register. The predetermined register is often referred to as an accumulator and is frequently accessed Assume that register A is the accumulator of the data processing system described in this implementation. Register A is also divided in a low order portion labelled "A0" and a high order portion labelled "A1".

The mpy X,Y,A instruction multiplies the "i" and "n" values together and stores the product in a predetermined register (A). The product of the mpy instruction is a fractional result which is stored to left of the decimal point. The asr A instruction shifts the contents of register A to the right by one bit to compensate for the fractional multiplication instruction. The move A0,A1 instruction moves the contents of one register (A0) location to the accumulator register (A1). In this implementation, the move instruction provides a sixteen bit left shift of the contents of register A. The contents of the register A0 are moved to the accumulator register A1 so that the information may be easily accessed. The register A1 then contains the product of "i" and "n" in integer form. The add B,A instruction adds then adds the contents of register A to "j" to provide a final result of the simple calculation. Although the software program written by the user of the fractional data processing system results in an integer product, the increased instruction cycle time results in a slower system response.

Illustrated in FIG. 1 is a data processing system 10 which contains a Multiplication Logic circuit 20 for efficiently executing both fractional and integer multiplication functions in a single software instruction. The data processing system 10 is generally comprised of a Program Controller 22 and the Multiplication Logic circuit 20. The Multiplication Logic circuit 20 is generally comprised of a Register A comprised of a Register $A_1$ 24 and a Register $A_0$ 26, a Register X 28, a Register Y 30, a Right Shift Logic circuit 32, an Adder 36, a Multiplier 34, and a Left Shift Logic circuit 38.

The Program Controller 22 provides a plurality of control and information signals to the Multiplication Logic circuit 20 via a Control Bus 15 and a Data Bus 13. The plurality of control signals is provided in response to software instruction information transferred via the Data Bus 13. A first portion of the information transferred by the Data Bus 13 contains software instruction information indicating whether or not a multiplication operation is initiated by the user of the data processing system 10. For example, a software instruction indicating the implementation of an integer multiply operation by the user of the data processing system 10 is labelled as "IMPY". Similarly, a software instruction indicating the implementation of an integer multiply/accumulate operation is labelled as "IMAC". An encoded opcode value corresponding to one of either the IMPY or IMAC instructions is transferred by the Data Bus 13. The encoded opcode value is decoded in the Program Controller 22 to subsequently provide a plurality of control signals which enable the Multiplication Logic circuit 20 during an integer multiply or an integer multiply/accumulate operation. Other opcode values corresponding to a plurality of fractional multiplication operations are also decoded in the Program Controller 22 to provide the plurality of control signals which enable the Multiplication Logic circuit 20 during the fractional multiplication operations.

A first portion of the plurality of control signals form a signal which is collectively labelled "Right Shift Control". The Right Shift Control signal provides a control input signal to enable the Right Shift Logic circuit 32 to function in a plurality of predetermined manners dependent on the software instruction being executed. For example, the Right Shift Logic circuit 32 is configured differently for the IMPY instruction and the IMAC instruction. A second portion of the plurality of control signals form a signal which is collectively labelled "Left Shift Control". The Left Shift Control signal provides a control input signal to enable the Left Shift circuit 38 to provide a plurality of predetermined functions, each function being dependent on the software instruction currently executed. Like the Right Shift Logic circuit 32, the Left Shift Logic circuit 38 is configured differently depending on the software instruction currently executed by the data processing system 10.

The plurality of control signals provided by the Program Controller 22 also includes a signal labelled "Multiply Control". The Multiply Control signal provides a control input signal to enable the Multiplier 34 to multiply two input signals to each other and to provide a multiplication product.

A control signal labelled "Data In 1" is also provided by the Program Controller 22. The Data In 1 signal provides a control input signal to enable Register X 28 to store information. A control signal labelled "Data In 2" is also provided by the Program Controller 22. The Data In 2 signal provides a control input signal to enable Register C 30 to store information. Additionally, the Program Controller 22 provides a control input signal labelled "Data Out 1". The Data Out 1 signal enables the Register X 28 to output information to a first input of the Multiplier 34. The Program Controller 22 also provides a control input signal labelled "Data Out 2". The Data Out 2 signal enables the Register C 30 to output information to a second input of the Multiplier 34.

Likewise, a control signal labelled "A Data In 1" is also provided by the Program Controller 22. The A Data In 1 signal provides a control input signal to enable the Register $A_1$ 24 to store information provided by either the Data Bus 13 or an output signal of the Left Shift Logic circuit 38. A control signal labelled "A Data In 2" is also provided by the Program Controller 22. The A Data In 2 signal provides a control input signal to enable the Register $A_0$ 26 to store information provided by either the Data Bus 13 or an output signal of the Left Shift Logic circuit 38. Additionally, the Program Controller 22 provides a control input signal labelled "A Data Out 1". The A Data Out 1 signal enables the Register $A_1$ 24 to output information to a first input of the Right Shift Logic circuit 32. The Program Controller 22 provides a control input signal labelled "A Data Out 2". The A Data Out 2 signal enables the Register $A_0$ 26 to output information to a second input of the Right Shift Logic circuit 32.

In a data processing system which primarily supports fractional multiplication operations, a predetermined register is often accessed by more of the software instructions of the data processing system than another register. The predetermined register is often referred to as an accumulator and is frequently accessed Assume that the Register $A_1$ 24 is the accumulator of the data processing system described in this implementation.

The plurality of control signals provided by the Program Controller 22 also includes a signal labelled "Add Control". The Add Control signal provides a control input signal to enable the Adder 36. The Adder 36 adds two input signals together to form a sum.

The Program Controller 22 also provides a plurality of information signals to the Multiplication Logic circuit 20 via the Data Bus 13. A first and a second operand value which respectively provide a first and a second input to the Multiplier 34 are determined by the user of the data processing system 10. Generally, software instructions implemented by the user of the data processing system 10 contain encoded values of the operands. For example, if the user has implemented a IMAC instruction, the instruction would have the form:

IMAC X, Y, A

A first operand value is labelled "X" and a second operand value is labelled "Y". During the IMAC instruction, the first and second operands are multiplied to form a product. Information currently stored in a register labelled "A" is shifted to the right by fifteen bits. The shifted information is then added to the product to form a first sum value. The first sum value is then shifted to the left by fifteen bits to form an integer result. The integer result of the IMAC instruction is then stored the register A.

The software instruction information including the encoded opcode value of the software instruction, the first and second operands, and the name of the register in which the result will be stored, is transferred to the Program Controller 22 by the Data Bus 13. The Program Controller 22 then decodes the software instruction information and outputs the correct control signals to respective portions of the Multiplication Logic circuit 20. The Data Bus 13 also transfers software instruction information to respective portions of the Multiplication Logic circuit 20 before the software instruction is implemented. The first operand value is stored in the Register X 28 and the second operand value is stored in the Register Y 30. The A register is comprised of Register $A_1$ 24 and Register $A_0$ 26.

The Multiplication Logic Circuit 20 efficiently executes a fractional or an integer multiplication function in accordance with the present invention. The Register X 28 is connected to the Data Bus 13 to receive a value of a first multiplicand in either type of multiplication operation when the Data In 1 signal is asserted. Likewise, when the Data In 2 signal is asserted, the Register Y 30 is connected to the Data Bus 13 to receive a value of a second multiplicand in either type of multiplication operation. The Register X 28 and the Register Y 30 respectively provide a first and a second input value to the Multiplier 34 when the Data Out 1 and Data Out 2 signals are asserted. The Multiply Control signal provides a control signal to enable the Multiplier 34 to provide a product of the first and second input values. The product of the first and second input values is connected to a first input of the Adder 36.

The Data Bus 13 is also connected to the Register A comprised of the Register $A_1$ 24 and the Register $A_0$ 26 to either provide or receive information in response to a software instruction specified by the user of the system. The Register $A_1$ 24 and the Register $A_0$ 26 provide a storage location for information used during execution of software instructions when the A Data In 1 and the A Data In 2 signals are asserted. The information stored in both the Register $A_1$ 24 and the Register $A_0$ 26 also provides a plurality of input signals to the Right Shift Logic circuit 32 when the A Data Out 1 and the A Data Out 2 signals are asserted.

The Right Shift Logic circuit 32 performs a variety of functions depending on the software instruction specified by the user of the system. For example, during either the IMAC software instruction, the Right Shift Logic circuit 32 is used to correctly align information stored in both the Register $A_1$ 24 and the Register $A_0$ 26 with a product output from a fixed point fractional Multiplier 34. During execution of a fractional Multiply/Accumulate (MAC) instruction, two operands are multiplied to each other and form a product which is subsequently added to another value. During the MAC instruction, the Right Shift Logic circuit 32 is used to transfer information from the Register $A_1$ 24 and the Register $A_0$ 26 without the arithmetic shift operation. The information is connected to the second input of the Adder 36. The first input of the Adder 36 is a multiplication product provided by the output of the Multiplier 34. The multiplication product and the information stored in the Register A are then added together. In a fractional multiply (MPY) instruction and an integer multiply instruction (IMPY), two operands are multiplied to each other and form a product which is collectively stored in the Register $A_1$ 24 and the Register $A_0$ 26. During the multiply instructions, the Right Shift Logic circuit 32 provides a logical value of zero to the second input of the Adder 36. Therefore, the result of a corresponding addition operation is simply the product of the multiplication operation.

The Shift Control signal provides a plurality of control signals to enable the Right Shift Logic circuit 32 to perform these various functions. In this embodiment of the invention, the function of the Right Shift Logic circuit 32 is determined by three control signals. A first control signal labelled "Integer Multiply/Accumulate" enables a first configuration of the Right Shift Logic circuit 32 during an IMAC instruction. A second control signal labelled "Multiply/Accumulate" enables a second configuration of the Right Shift Logic circuit 32. The Multiply/Accumulate signal is asserted when the user of the data processing system 10 implements the MAC instruction to perform a fractional multiplication operation and then add the product of the operation to the contents of a specified register. Additionally, a third control signal labelled "Multiply" enables a third configuration of the Right Shift Logic circuit 32. The Multiply signal is asserted when the user of the data processing system 10 implements either an integer or a fractional MPY instruction to simply multiply two operands together. The Right Shift Logic circuit 32 is configured differently for each of the software instructions discussed above and, therefore, provides three different responses to each control signal.

Figure 2:
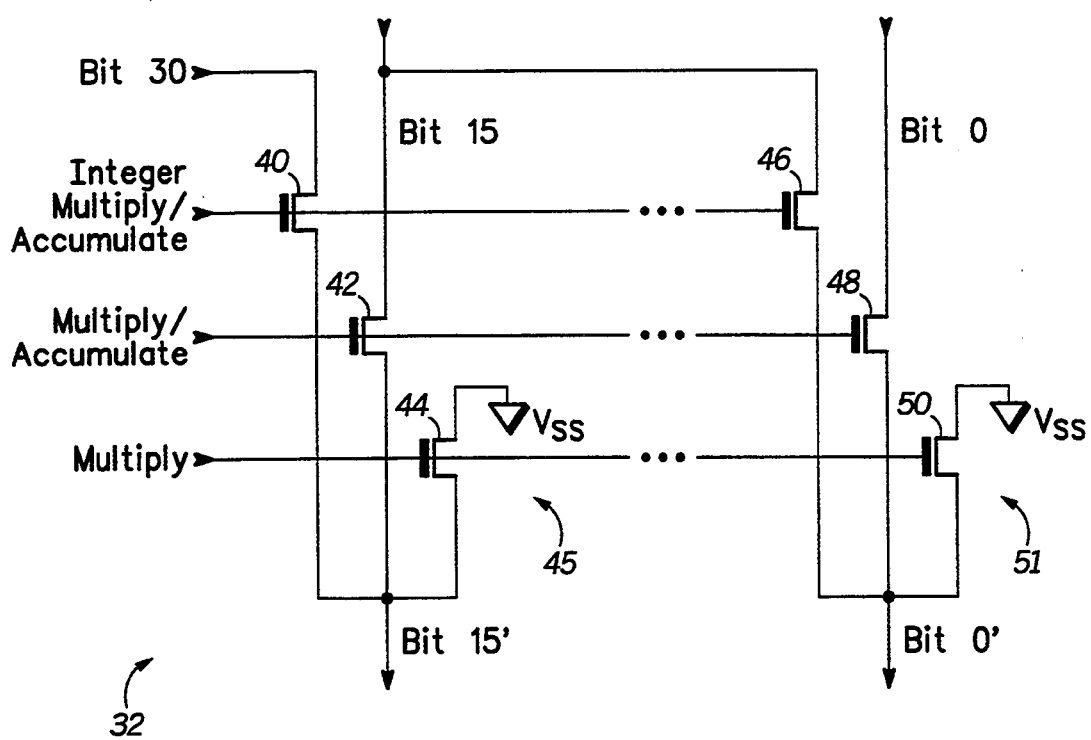
FIG. 2 illustrates in logic diagram form a right shift logic circuit of FIG. 1.

FIG. 2 illustrates a portion of the logic circuitry used to implement the Right Shift Logic circuit 32. The Right Shift Logic circuit 32 is comprised of a plurality of control cells, such as 45 and 51, which correspond to a predetermined bit of information collectively stored in the Register $A_1$ 24 and the Register $A_0$ 26. The Right Shift Control signal provides the plurality of control signals to enable the Right Shift Logic circuit 32 to perform various operations. As described above, the plurality of control signals is comprised of the Integer Multiply/Accumulate signal, the fractional Multiply/Accumulate signal, and the Multiply signal.

In this embodiment of the invention, each one of the plurality of control cells is comprised of three transistors. The control cell 45 controls the access of and modification to information associated with bit fifteen of the information transferred from the Register $A_1$ 24 and the Register $A_0$ 26. In control cell 45, the Integer Multiply/Accumulate signal is connected to a control electrode of a first transistor 40. A signal labelled "Bit 30" provides an input to a first current electrode of the first transistor 40. The Bit 30 signal provides the value of bit thirty of the information input to the Right Shift Logic circuit 32. A second current electrode is connected to an output signal labelled "Bit 15'". The Bit 15' signal provides the value of bit fifteen of the information output by the Right Shift Logic circuit 32.

The Multiply/Accumulate signal is connected to a control electrode of transistor 42 in control cell 45. A signal labelled "Bit 15" provides an input to the first current electrodes of the transistor 42. The Bit 15 signal transfers the information associated with bit fifteen of the data collectively provided by the Register $A_1$ 24 and the Register $A_0$ 26. The Bit 15' signal is connected to the second current electrode of transistor 42. In this configuration, the value of the Multiply/Accumulate signal determines whether or not the information transferred by the Bit 15 signal will be transferred to the Bit 15' signal and propagate to subsequent logic circuitry.

The Multiply signal is connected to a control electrode of transistor 44 in control cell 45. A first current electrode of transistor 44 is connected to an electrical ground reference voltage. A second current electrode of transistor 44 is connected to the Bit 15' signal.

Likewise, the control cell 51 controls the access of and modification to information associated with bit zero of the information transferred from the Register $A_1$ 24 and the Register $A_0$ 26. In control cell 51, the Integer Multiply/Accumulate signal is connected to an input to a control electrode of a first transistor 46. The Bit 16 signal provides an input to a first current electrode of the first transistor 46. A second current electrode is connected to a signal labelled "Bit 0'". The Bit 0' signal provides the value of bit zero of the information output by the Right Shift Logic circuit 32.

The Multiply/Accumulate signal is connected to a control electrode of transistor 48 in control cell 51. A signal labelled "Bit 0" provides an input to the first current electrode of the transistor 48. The Bit 0 signal transfers the information associated with bit zero of the data collectively provided by the Register $A_1$ 24 and the Register $A_0$ 26. The Bit 0' signal is connected to the second current electrode of transistor 48. In this configuration, the value of the Multiply/Accumulate signal determines whether or not the information transferred by the Bit 0 signal will be transferred to the Bit 0' signal and propagate to subsequent logic circuitry.

The Multiply signal is connected to a control electrode of transistor 50 in control cell 51. A first current electrode of transistor 50 is connected to an electrical ground reference voltage. A second current electrode of transistor 50 is connected to the Bit 0' signal.

During operation, the Right Shift Logic circuit 32 provides a plurality of output signals in response to the plurality of control signals transferred via the Right Shift Control signal. For example, if an IMAC instruction is implemented by the user of the data processing system 10, the Integer Multiply/Accumulate signal is asserted. The control gate of the transistor 40 is then enabled in control cell 45. The value of the Sign Bit signal is subsequently transferred to the Bit 15' signal and is output from the Right Shift Logic circuit 32. Likewise, the control gate of transistor 46 in control cell 51 is also enabled when the Integer Multiply/Accumulate signal is asserted. The value of the Bit 15 signal is subsequently transferred to the Bit 0' signal and output from the Right Shift Logic circuit 32. In effect, the information input to the Right Shift Logic circuit 32 is shifted to the right fifteen bits when the Integer Multiply/Accumulate signal is asserted. It should be noted that the number of bits which are shifted to the right is determined by the number of bits of operand precision less one.

When a fractional Multiply/Accumulate (MAC) software instruction is implemented by the user of the data processing system 10, two operand values are multiplied together to form a product. The product is then added to the contents of a predetermined register When the MAC instruction is executed, the Multiply/Accumulate signal is asserted and the control gates of both transistor 42 and transistor 48 are enabled. When the control gate of transistor 42 is enabled in control cell 45, the value of the Bit 15 signal is transferred to the Bit 15' signal. When the control gate of transistor 48 is enabled in control cell 51, the value of the Bit 0 signal is transferred to the Bit 0' signal. In effect, the information input to the Right Shift Logic circuit 32 is gated and output without any form of modification when the Multiply/Accumulate signal is asserted. In this example, the input information is the data value collectively stored in the Register $A_1$ 24 and the Register $A_0$ 26.

A fractional multiply software instruction is labelled as "MPY" and an integer multiply software instruction is labelled as "IMPY". In either type of multiply software instruction, two operand values are multiplied together to form a product. When either of the MPY or IMPY software instructions are executed, the Multiply signal is asserted and the control gates of both transistor 44 of control cell 45 and transistor 50 of control cell 51 are enabled. Since the first current electrodes of both the transistor 44 and the transistor 50 are connected to the electrical ground reference voltage, the second current electrode of each of the transistors 44 and 50 is also pulled to the electrical ground reference voltage. Therefore, because the second current electrode of each of the transistors 44 and 50 is respectively connected to the Bit 15' and the Bit 0' signals respectively, the Bit 15' and the Bit 0' signals are pulled to the electrical ground reference voltage. A plurality of bit signals including the Bit 16' and the Bit 0' signals output by the plurality of control cells are also pulled to the electrical ground reference voltage. The Right Logic Shift circuit 32 subsequently provides a logic value of zero to the second input of the Adder 36.

The plurality of signals output by the Right Shift Logic circuit 32 during any of the multiplication operations previously discussed provides a second input to the Adder 36. The Add Control signal provides a control signal to enable the Adder 36 to add the first and second input signals to form a thirty-two bit sum. The sum of the addition operation subsequently provides a plurality of input signals to the Left Shift Logic circuit 38.

Figure 3:
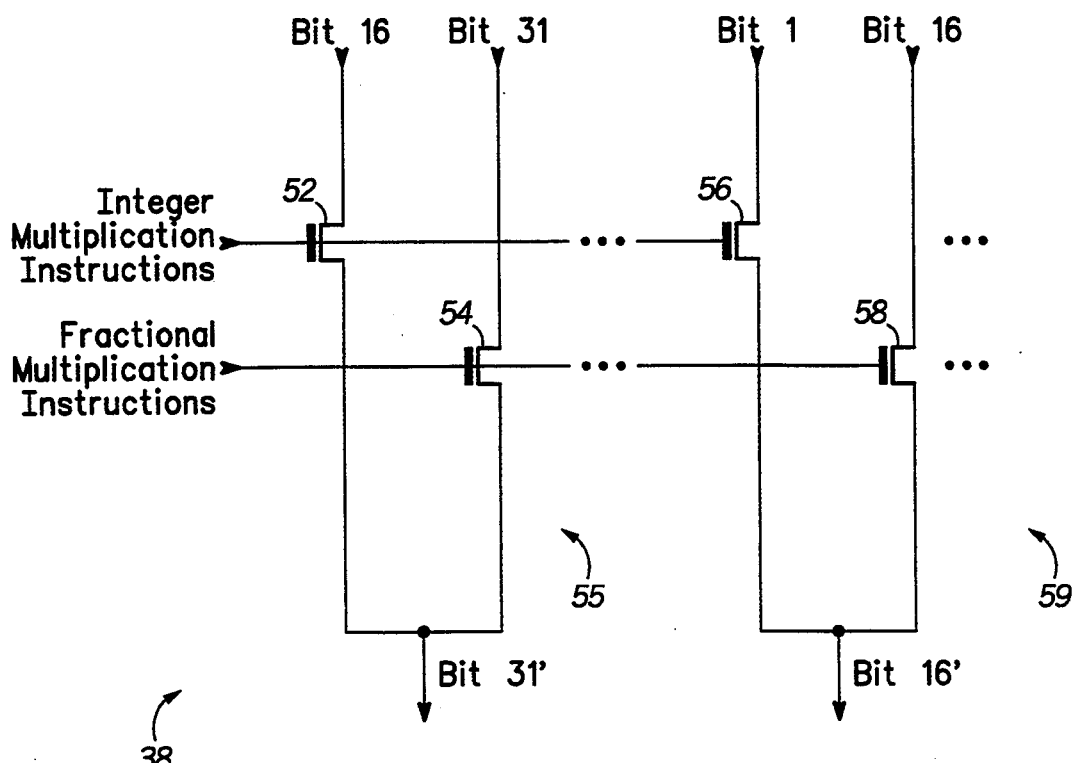
FIG. 3 illustrates in logic diagram form a left shift logic circuit of FIG. 1.

The Left Shift Logic circuit 38 is illustrated in FIG. 3 in greater detail. The Left Shift Logic circuit 38 is comprised of a plurality of control cells, such as 55 and 59, which correspond to a predetermined bit of information provided by the Adder 36. The Left Shift Control signal provides a plurality of control signals to enable the Left Shift Logic circuit 38 to perform various operations. The plurality of control signals is comprised of a signal labelled "Integer Multiplication Instruction" and a signal labelled "Fractional Multiplication Instruction". The Integer Multiplication Instruction signal is asserted during an integer multiplication instruction such as an IMAC or an IMPY, and the Fractional Multiplication Instruction is asserted during a fractional multiplication instruction such as a MAC or a MPY.

In this embodiment of the invention, each one of the plurality of control cells is comprised of two transistors. The control cell 55 controls the access of and the modification to information associated with both bit thirty-one and bit sixteen of the information output by the Adder 36. In the control cell 55, the Integer Multiplication Instruction signal is connected to an input of a control electrode of a first transistor 52. A signal labelled "Bit 16" provides an input to a first current electrode of the first transistor 52. The Bit 16 signal corresponds to bit sixteen of the information output by the Adder 36. A second current electrode of the first transistor 52 is connected to a signal labelled "Bit 31'". The Bit 31' signal corresponds to bit thirty-one of an information value output by the Left Shift Logic circuit 38.

The Fractional Multiplication Instruction signal is connected to a control electrode of transistor 54 in control cell 55. A signal labelled "Bit 31" provides an input to the first current electrodes of the transistor 54. The Bit 31 signal transfers the information associated with bit thirty-one of the data transferred from the Adder 36. The Bit 31' signal is connected to the second current electrode of transistor 54. In this configuration, the value of the Fractional Multiplication Instruction signal determines whether or not the information transferred by the Bit 31 signal will be transferred to the Bit 31' signal and propagate to subsequent logic circuitry.

Likewise, the control cell 59 controls the access of and modification to information associated with both bit sixteen and bit one of the information transferred from the Adder 36. In control cell 59, the Integer Multiplication Instruction signal is connected to an input to a control electrode of a first transistor 56. A signal labelled "Bit 1" provides an input to the first current electrode of the first transistor 56. The Bit 1 signal transfers the information associated with bit one of the data transferred from the Adder 36. A second current electrode is connected to a signal labelled "Bit 16'". The Bit 16' signal provides the value of bit sixteen of the information output by the Left Shift Logic circuit 38.

The Fractional Multiplication Instruction signal is connected to a control electrode of transistor 58 in control cell 59. The Bit 16 signal provides an input to the first current electrode of the transistor 58. The Bit 16' signal is connected to the second current electrode of transistor 58. In this configuration, the value of the Fractional Multiplication Instruction signal determines whether or not the information transferred by the Bit 16 signal will be transferred to the Bit 16' signal and propagate to subsequent logic circuitry.

During operation, the Left Shift Logic circuit 38 provides a plurality of output signals in response to both the information transferred via the Adder 36 and the plurality of control signals transferred via the Left Shift Control signal. For example, if an integer multiplication instruction is implemented by the user of the data processing system 10, the Integer Multiplication Instruction signal is asserted. The control gate of the transistor 52 is then enabled in control cell 55. The value of the Bit 16 signal is subsequently transferred to the Bit 31' signal and is output from the Left Shift Logic circuit 38. Likewise, the control gate of transistor 56 in control cell 59 is also enabled when the Integer Multiplication Instruction signal is asserted. The value of the Bit 1 signal is subsequently transferred to the Bit 16' signal and output from the Left Shift Logic circuit 38. In effect, the information input to the Left Shift Logic circuit 38 is shifted to the left fifteen bits when the Integer Multiplication Instruction signal is asserted. It should be noted that the number of bits which are shifted to the left is determined by the number of bits of operand precision less one.

When a fractional multiplication instruction signal is implemented by the user of the data processing system 10, the Fractional Multiplication Instruction signal is asserted. The control gates of both transistor 54 and transistor 58 are enabled. When the control gate of transistor 54 is enabled in control cell 55, the value of the Bit 31 signal is transferred to the Bit 31' signal. When the control gate of transistor 58 is enabled in control cell 59, the value of the Bit 16 signal is transferred to the Bit 16' signal. In effect, the information input to the Left Shift Logic circuit 38 is gated and output to the Register A without any form of modification when the Fractional Multiplication Instruction signal is asserted. In this example, the input information is provided by the Adder 36.

The positions of both the Right Shift Logic circuit 32 and the Left Shift Logic circuit 38 result in the ability of the data processing system 10 to execute integer multiply/accumulate operations in a fractional multiplication environment more efficiently. For example, assume that the user of the data processing system 10 implements the software program which was required to calculation of the array address, an integer value.

In the embodiment of the invention described herein, a single software instruction executes the equation to determine the value of an array address. The equation is listed below:

$$\text{Position} = (i \times n) + j$$

In the equation shown above, "i" equals the row of the data entry, "n" equals the number of columns in the memory array, and "j" equals the column of the data entry. To provide the result of the equation in the fractional data processing system, a single software instruction must be implemented:

| 1 | imac | X,Y,A |

In the program listed above, assume that a register X contains the value of "i", a register Y contains the value of "n", a register A contains the value of "j", and a register A stores the results of the software program. Register A is also divided in a low order portion labelled "A0" and a high order portion labelled "A1".

As previously described, the imac X,Y,A instruction multiplies two operands (X and Y) together, shifts the contents of a register (A) to the right fifteen bits, adds the product of the two operands to the shifted register contents, shifts the resultant sum to the left fifteen bits, and then stores the resultant sum in the register (A). A single software instruction is needed in the preferred embodiment of the invention described herein, as compared to four software instructions needed in prior implementations. The IMAC instruction replaces both the shift and move instructions used in previous implementations of multiplication logic circuits. As a result, the number of instruction cycles is decreased and the efficiency of the Multiplication Logic circuit 20 is increased.

The data processing system 10 executes the integer multiply/accumulate function implemented by the IMAC software instruction in the following manner. Before the IMAC software instruction is executed, the user of the data processing system must store the correct data values in the appropriate registers. To implement the equation to determine the array address, the user of the data processing system 10 must first store "i", the value of the row of the data entry in the Register X 28. The value of the number of columns, "n", must also be stored in the Register Y 30 and the value of the column of the data entry, "j" must be stored in the Register $A_1$ 24.

In a first step of an integer multiply/accumulate function, the contents of the Register X 28 and the Register Y 30 are transferred to the first and second inputs of the Multiplier 34 when the Data Out 1 and the Data Out 2 signals are asserted. The Multiply Control signal provided by the Control Bus 15 is then asserted and the two operands are multiplied together to produce a thirty-two bit first partial product. The first partial product provides a first input to the Adder 36.

When the A Data Out 1 and the A Data Out 2 signals are asserted, the information stored in the Register A is provided as an input to the Right Shift Logic 32. Likewise, the Integer Multiply/Accumulate signal provided as a control input to the Right Shift Logic circuit 32 is also asserted during execution of the IMAC instruction. The Integer Multiply/Accumulate signal enables the control gate of transistor 40 of control cell 45 and the control gate of transistor 46 of control cell 51. The first current electrode of transistor 40 is connected to the Bit 30 signal. When the Integer Multiply/Accumulate signal enables the control gate of transistor 40, the second current electrode is pulled to the value of the Bit 30 signal. Therefore, because the second current electrode is connected to the Bit 15' signal, the Bit 15' signal is also pulled to the value of the Bit 30 signal. Similarly, the first current electrode of transistor 46 is connected to the Bit 15 signal. When the Integer Multiply/Accumulate signal enables the control gate of transistor 46, the second current electrode is pulled to the value of the Bit 15 signal. Therefore, because the second current electrode is connected to the Bit 0' signal, the Bit 0' signal is also pulled to the value of the Bit 15 signal. In effect, the information input to the Right Shift Logic circuit 32 is shifted to the right fifteen bits when the Integer Multiply/Accumulate signal is asserted. In this example, the input information is stored in the Register $A_1$ 24. Therefore, the value of the column of the data entry is shifted to the fight by fifteen bits such that the value is correctly positioned to participate in subsequent arithmetic operations.

Because the Multiplier 34 is implemented in a data processing system 10 which primarily supports fractional multiplication operations, when integer values are multiplied to each other, the product appears in a fractional form. The fractional form puts the result of the multiplication operation in the right most bits of the output signal provided by the Multiplier 34. Therefore, the Right Shift Logic circuit 32 must shift integer predetermined values to the right such that the predetermined integer values will correctly participate in subsequent arithmetic operations with the result of the multiplication operation. In previous multiplication logic circuits, a shift and move instruction are used to implement the operation accomplished by the Right Shift Logic circuit 32.

The shifted information provides a second input to the Adder 36. The Add Control signal is then asserted and the two input signals are added together. A sum value provides an input to the Left Shift Logic circuit 38.

The Integer Multiplication Instruction signal is asserted during an Integer Multiply/Accumulate software instruction. The Integer Multiplication Instruction signal enables the control electrode of the transistor 52 of the control cell 55 and the control electrode of the transistor 56 of the control cell 59. When the control electrode of the transistor 52 is enabled, the value of the Bit 16 signal is transferred to the Bit 31' signal. Likewise, when the control electrode of the transistor 56 is enabled, the value of the Bit 1 signal is transferred to the Bit 16' signal. In effect, the sum value input to the Left Shift Logic circuit 38 is shifted to the left fifteen bits such that the sum value is subsequently in an integer form. An integer form assumes that a plurality of bits comprising an information value are located to the left of a fixed decimal point. Additionally, the integer form requires that not one of the plurality of bits is located to the right of the decimal point.

The shifted sum is then stored in a Register A comprised of Register $A_1$ 24 and Register $A_0$ 26 when the A Data In 1 and the A Data In 2 signals are respectively asserted.

An integer multiply (IMPY) software instruction is similarly executed. During execution of the IMPY software instruction, however, the Right Shift Logic circuit 32 provides a different response. The Multiply signal is provided as a control input to the Right Shift Logic circuit 32 during execution of the IMPY instruction. The Multiply signal enables the control gate of transistor 44 of control cell 45 and the control gate of transistor 50 of control cell 51. The first current electrode of the transistor 44 is connected to the electrical ground reference voltage. When the Integer Multiply signal enables the control gate of transistor 44, the second current electrode is pulled to the value of the electrical ground reference voltage. Similarly, the first current electrode of transistor 50 is connected to the electrical ground reference voltage. Therefore, because the second current electrode of each of the transistors 44 and 50 is respectively connected to the Bit 15' and the Bit 0' signals respectively, the Bit 15' and the Bit 0' signals are pulled to the electrical ground reference voltage. A plurality of bit signals including the Bit 16' and the Bit 0' signals output by the plurality of control cells are also pulled to the electrical ground reference voltage. The Right Shift Logic circuit 32 subsequently provides a logic value of zero to the second input of the Adder 36.

The two inputs to the Adder 36 are summed when the Add Control signal is asserted and the sum is output to the Left Shift Logic circuit 38. Because the IMPY instruction involves an integer multiplication operation, the Left Shift Logic circuit 38 then shifts the sum to the left fifteen bits. The shifted sum is subsequently stored in the Register $A_1$ 24.

It should be well understood that an apparatus which executes integer multiplication operations in a data processing system 10 which primarily supports fractional operations results in a more versatile and efficient data processing system. By placing both the Right Shift Logic circuit 32 and the Left Shift Logic circuit 38 in the Multiplication Logic circuit 20, integer multiplication operations may be accomplished by the execution of a single software instruction. Previous data processing systems have required a plurality of software instructions to accomplish the same result. Additionally, both the Right Shift Logic circuit 32 and the Left Shift Logic circuit 38 are configured to allow for a variety of multiplication operations. Both circuits are easily implemented and require only a small amount of added circuitry.

By now it should be apparent that an apparatus which efficiently executes integer multiplication operations on a fractional multiplier has been provided. There are many additional configurations for implementing the invention described above. For example, the Register $A_1$ 24, Register $A_0$ 26, Register X 28 and Register Y 30 could be implemented as separate registers or as a portion of a register bank. Each of the plurality of registers implemented in the data processing system 10 might represent one of a plurality of portions of a single register. Separate busses could also be used to provide information to each one of the registers. Additionally, the Multiplier 34 and the Adder 36 could both be implemented with any standard logic implementation. For example, the Multiplier 34 and the Adder 36 might be implemented as separate circuits with an optional latch circuit located between the two circuits. The Multiplier 34 and the Adder 36 could also be combined in a single logic circuit. The control signals described herein are provided by way of example only. All of the control signals output by the Control Bus 15 may be modified and some of the control signals may even be deleted from the design. For example, the designer of the data processing system 10 might delete the Multiply Control and Add Control signals and enable the Multiplier 32 and the Adder 36 at all times during operation. The Right Shift Logic circuit 32 could also include more than three control input signals. Additionally, the Left Shift Logic circuit 32 could also include more than two control input signals. For example, another instruction involving a multiply or a similar operation could be easily integrated in the hardware implementation of the both the Right Shift Logic circuit 32 and the Left Shift Logic circuit 38. As well, the electrical ground reference voltage used in the Right Shift Logic circuit 32 to execute multiply instructions could be replaced with another voltage value. Likewise, the user of the data processing system 10 could be required to clear the contents of the accumulator with a software instruction before executing the multiply function.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor, comprising:
    a controller for receiving one of a first instruction and a second instruction, the controller decoding the first instruction to provide a first control signal and a second control signal, the controller decoding the second instruction to provide a third control signal and a fourth control signal;

a data bus for providing a plurality of data values;

an accumulator having an input coupled to the data bus for receiving a first one of the plurality of data values;

first shifting means coupled to the accumulator for receiving the first one of the plurality of data values, the first shifting means selectively right shifting the first one of the plurality of data values by fifteen bits in response to the first control signal, the first shifting means selectively transferring the first one of the plurality of data values without shifting in response to the third control signal;

a first register having an input coupled to the data bus for receiving a second one of the plurality of data values;

a second register having an input coupled to the data bus for receiving a third one of the plurality of data values;

a multiplier for selectively multiplying the second one of the plurality of data values and the third one of the plurality of data values to provide a product;

an adder having a first input coupled to the first shifting means for receiving a transferred output and a second input coupled to the multiplier for receiving the product, the adder selectively adding the transferred output and the product to provide a sum; and second shifting means coupled to the adder for receiving the sum, the second shifting means selectively left shifting the sum by fifteen bits and transferring a shifted sum to the accumulator in response to the second control signal, the second shifting means selectively transferring the sum without shifting in response to the fourth control signal.

2. The data processor of claim 1 wherein the first instruction is an integer multiply accumulate instruction having a mnemonic form of IMAC.

3. The data processor of claim 1 wherein the second instruction is a fractional multiply accumulate instruction having a mnemonic form of MAC.

4. The data processor of claim 1 wherein the first control signal is asserted when an integer multiply accumulate instruction is executed, the second control signal is asserted when an integer instruction is executed, the third control signal is asserted when a fractional multiply accumulate instruction is executed, and the fourth control signal is asserted when a fractional instruction is executed.

5. The data processor of claim 1 wherein the controller decodes one of the first instruction and the second instruction to provide a fifth control signal, the fifth control signal enabling the multiplier to multiply the second and third ones of the plurality of data values to provide the product.

6. The data processor of claim 1 wherein the controller decodes one of the first instruction and the second instruction to provide a sixth control signal, the sixth control signal enabling the adder to add the transferred output and the product to provide the sum.

7. The data processor of claim 1 wherein the controller receives a third instruction and decodes the third instruction to provide a fifth control signal to the first shifting means, the first shifting means outputting a value of zero in response to the fifth control signal.

8. The data processor of claim 1 wherein the first shifting means comprises a plurality of shift cells, wherein each of the plurality of shift cells corresponds to a bit of the first one of the plurality of data values.

9. The data processor of claim 8 wherein each of the plurality of bit cells shifts a more significant bit of the first one of the plurality of data values when the first control signal is asserted and a corresponding bit of the first one of the plurality of data values when the third control signal is asserted.

10. The data processor of claim 9 wherein each of the plurality of bits cells shifts a zero when a fifth control signal is asserted.

11. The data processor of claim 1 wherein the second shifting means comprises a plurality of shift cells, wherein each of the plurality of shift cells corresponds to a bit of the sum.

12. The data processor of claim 11 wherein each of the plurality of bit cells shifts a less significant bit of the sum when the second control signal is asserted and a corresponding bit of the sum when the fourth control signal is asserted.

13. A method for executing a multiplication function in a data processing system, comprising the steps of:

receiving one of a first instruction and a second instruction;

decoding the first instruction to provide a first control signal and a second control signal when the first instruction is received;

decoding the second instruction to provide a third control signal and a fourth control signal when the second instruction is received;

communicating a plurality of data values via a data bus;

storing a first one of the plurality of data values in an accumulator, the accumulator being coupled to the data bus for receiving the first one of the plurality of data values;

selectively right shifting the first one of the plurality of data values by fifteen bits to provide a transferred output when the first control signal is asserted;

selectively transferring the first one of the plurality of data values without shifting to provide the transferred output when the third control signal is asserted;

storing a second one of the plurality of data values in a first register, the first register being coupled to the data bus for receiving the second one of the plurality of data values;

storing a third one of the plurality of data values in a second register, the second register being coupled to the data bus for receiving the third one of the plurality of data values;

selectively multiplying the second one of the plurality of data values and the third one of the plurality of data values to provide a product;

selectively adding the transferred output and the product to provide a sum;

selectively left shifting the sum by fifteen bits to provide a shifted sum when the second control signal is asserted;

selectively transferring the shifted sum to the accumulator when the second control signal is asserted; and selectively transferring the sum without shifting when the fourth control signal is asserted.

14. The method of claim 13 wherein the first instruction is an integer multiply accumulate instruction and the second instruction is a fractional multiply accumulate instruction.

15. The method of claim 13 further comprising the steps of:
asserting the first control signal when the first instruction is an integer multiply accumulate instruction;
asserting the second control signal when the first instruction is an integer instruction;
asserting the third control signal when the second instruction is a multiply accumulate instruction; and
asserting the fourth control signal when the second instruction is a fractional instruction.

16. A data processor, comprising:
a controller for receiving one of an integer multiplication accumulation instruction and a fractional multiplication accumulation instruction, the controller decoding the integer multiplication instruction to provide a first control signal and a second control signal, the controller decoding the fractional multiplication instruction to provide a third control signal and a fourth control signal;
a data bus for providing a plurality of data values;
an accumulator having an input coupled to the data bus for receiving a first one of the plurality of data values;
first shifting means coupled to the accumulator for receiving the first one of the plurality of data values, the first shifting means selectively right shifting the first one of the plurality of data values by fifteen bits in response to the first control signal, the first shifting means selectively transferring the first one of the plurality of data values without right shifting in response to the third control signal;
a first register having an input coupled to the data bus for receiving a second one of the plurality of data values;
a second register having an input coupled to the data bus for receiving a third one of the plurality of data values;
a multiplier for selectively multiplying the second one of the plurality of data values and the third one of the plurality of data values to provide a product;
an adder having a first input coupled to the first shifting means for receiving a transferred output and a second input coupled to the multiplier for receiving the product, the adder selectively adding the transferred output and the product to provide a sum; and
second shifting means coupled to the adder for receiving the sum, the second shifting means selectively left shifting the sum by fifteen bits and transferring a shifted sum to the accumulator in response to the second control signal, the second shifting means selectively transferring the sum without shifting in response to the fourth control signal.

17. The data processor of claim 16 wherein the controller receives a third instruction to provide a fifth control signal to the first shifting means, the first shifting means outputting a value of zero in response to the fifth control signal.

18. The data processor of claim 17 where the first shift means comprises a plurality of shift cells wherein each of the plurality of shift cells corresponds to a bit of the sum, each of the plurality of shift cells shifts a more significant bit of the sum when the first control signal is asserted, a corresponding bit of the sum when the third control signal is asserted, and a zero when the fifth control signal is asserted.

19. The data processor of claim 16 wherein the second shifting means comprises a plurality of shift cells wherein each of the shift cells corresponds to bit of the sum, each of the plurality of shift cells shifts a less significant bit of the sum when the second control signal is asserted and a corresponding bit of the sum when the fourth control signal is asserted.

* * * * *